May 11, 1965  P. CHEMIN ETAL  3,183,162
SEALING SYSTEM FOR THE HANDLING HOOD OF A NUCLEAR REACTOR
Filed Oct. 22, 1962  2 Sheets-Sheet 2

INVENTORS
PAUL CHEMIN
JEAN LEPHILIBERT
BY
ATTORNEYS 3,183,162
SEALING SYSTEM FOR THE HANDLING HOOD
OF A NUCLEAR REACTOR
Paul Chemin, Paris, and Jean Lephilibert, Montelimar,
France, assignors to Commissariat à l'Energie Atomique, Paris, France
Filed Oct. 22, 1962, Ser. No. 231,903
Claims priority, application France, Oct. 25, 1961,
876,954
10 Claims. (Cl. 176—30)

The present invention relates to an improvement in devices employed for the purpose of loading or unloading the fuel in a nuclear reactor and which are ordinarily referred-to as "handling hoods."

The purpose of the invention is to improve the operation of devices of the type mentioned above by ensuring perfect fluid-tightness between the hood and the reactor channel employed for the purpose of transferring the fuel, while at the same time providing better accessibility to the various components of the hood in order to permit of their maintenance or their replacement as a result of damage.

The invention mainly consists both in setting the hood body in position above a loading channel which passes through the top plug of the reactor by means of a set of two trolleys adapted to move in two directions at right angles to each other and in bringing the hood body to rest on one of the trolleys by means of hydraulic jacks designed to effect the vertical displacement of said hood body so as to cause this latter to be applied in fluid-tight manner against a movable ring which is disposed at the top portion of the loading channel and which is supported elastically by means of an assembly of springs.

Apart from this principal arrangement, the invention consists of certain secondary arrangements which will be explained in greater detail below in the course of the description of one example of construction which, as will be understood, is not given in any sense by way of limitation.

Figure 1:
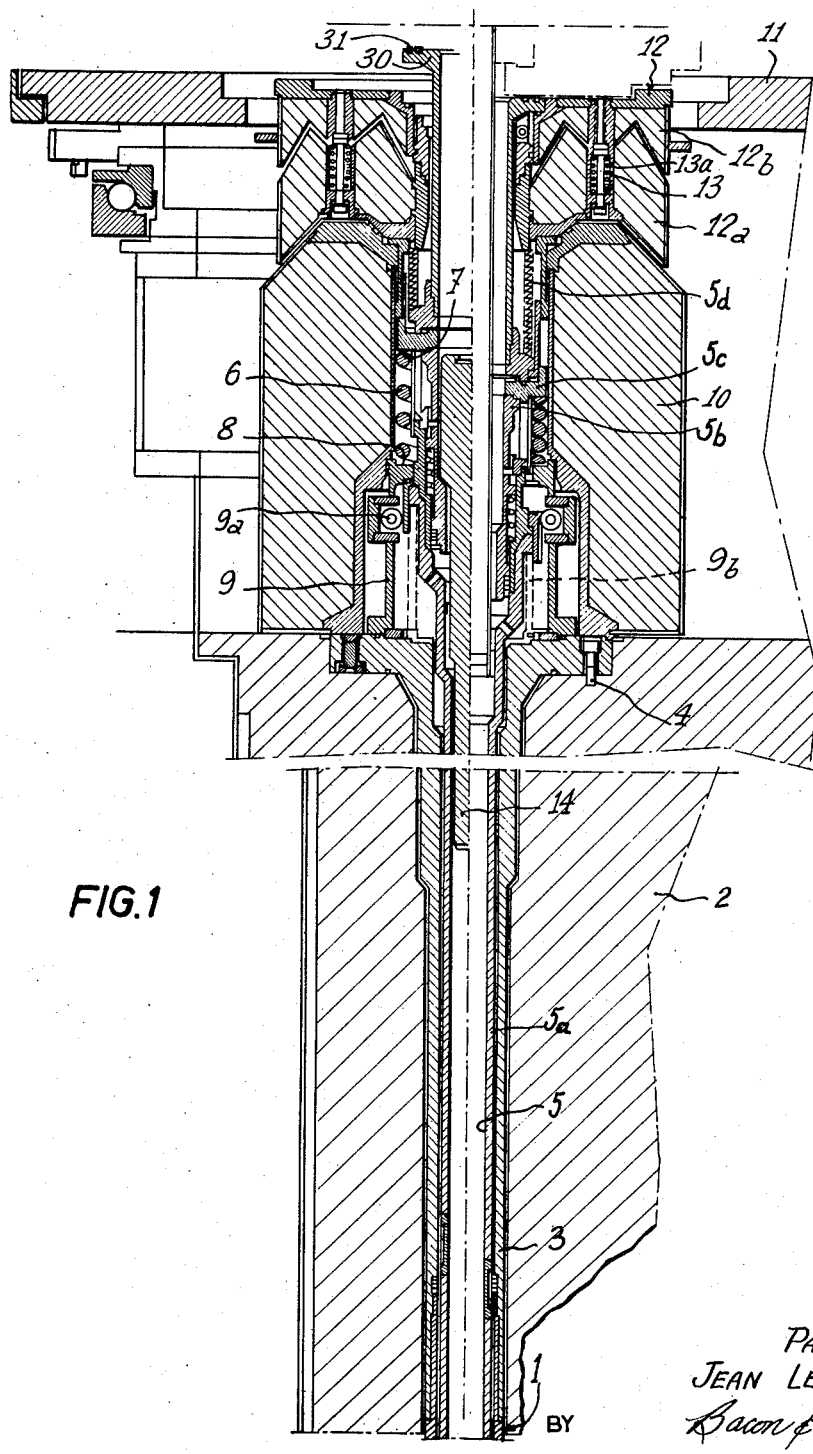

In the accompanying drawings:

FIG. 1 illustrates a view in vertical cross-section of the top portion of the loading channel fitted with a movable ring designed in accordance with the invention. The left hand portion of the drawing illustrates the movable ring in the position which it occupies prior to positioning of the handling hood, the loading channel being sealed-off by means of a plug. The right hand side of the same drawing shows the ring in the position reached when once the hood has been set in position, the loading channel being in that case shown in the open condition.

Figure 2:
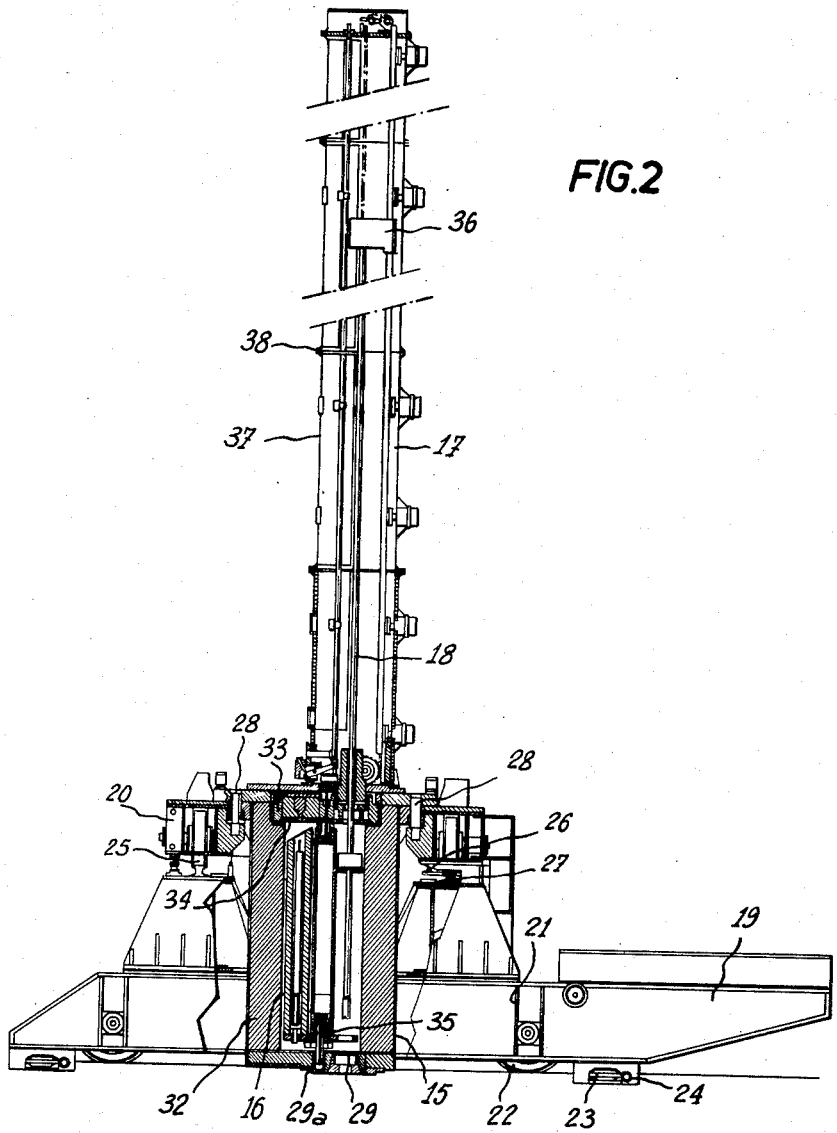

FIG. 2 represents a general view of the handling hood as seen on a smaller scale and in vertical cross-section.

It is useful first of all to make it clear that the handling operations essentially consist in withdrawing fuel element assemblies, control rods and liners to a distance away from the reactor casing for the purpose of storage and then removal, or else in reintroducing the same elements either in a new, repaired or reprocessed condition into the reactor, while at the same time providing a circulation of inert fluid for the purpose of cooling the elements as these latter are being transferred.

It will therefore be readily understood that the execution of the above-mentioned operations can be very greatly facilitated if an apparatus is employed in which the combined assembly of generally delicate mechanisms for operation and control is removed to a location outside the leakproof reactor tank or casing in order to facilitate their maintenance or subsequent replacement.

Provision is made in accordance with the invention for the utilization of a vertically moving hood provided with an outlet orifice which can be lowered into position so as to come exactly into contact with the top orifice of a channel which passes through the top plug of the reactor and through which the transfer of fuel is carried out.

The handling operation proper can thereupon be effected, for example by means of a rod fitted at the end thereof with a handling gripper or pair of grappling tongs, the fuel units or assemblies being transferred in a single vertical movement from their location inside the hood to their position inside the reactor, or conversely. Communication between the hood and the reactor tank is accordingly established under perfect conditions of fluid-tightness and, as a particular consequence, makes it easy to provide for the continuous circulation of inert coolant both through the loading channel and the hood which is connected to it.

As shown in FIG. 1, the loading channel 1 passes vertically through the top plug 2 of the reactor. In the example of construction which has been chosen, the said plug is located inside a second rotatable plug (not shown) and in excentric relation to this latter so that, as a result of the successive rotation of each plug, the loading channel can be suitably placed in any position above the core or active portion of the pile. The channel is provided with a vertical tube 3 or so-called "fixed sleeve" which is made integral with the rotatable plug 2 by means of screws such as the screw 4. Provision is made inside the sleeve 3 for a second tube 5 made up of a number of sections 5a, 5b and 5c, or so-called "holding tube" which is capable of taking up two positions, namely, a top position during the operation of the pile or a bottom position during the handling operations. The holding tube 5 is continuously forced back towards the top end of the handling channel 1 by a coil spring 6, one end of which is applied against the underface 7 of the annular flange 5c which forms the bottom portion of the tube 5, while the other end of said coil spring is applied against a shoulder 8 of a box 9 which is rigidly fixed to the fixed sleeve 3 and in the interior of which is located a mechanism comprising a pinion 9a and rack 9b, the said rack and pinion mechanism serving to control the movements of displacement of the entire tube 5 inside the sleeve 3 by means, for example, of a rotary potentiometer, not shown.

In accordance with the invention, the top portion of the loading channel 1 comprises a movable ring which is intended to provide the fluid-tight coupling between the handling hood and the channel in the manner which will be described below. The said ring is designed for this purpose in two parts consisting on the one hand of a stationary bottom bushing 10 located above the rotatable plug 2 between the top end of said plug and the floor 11 upon which the hood is intended to move and, on the other hand, a removable unit 12 which is placed in position prior to the commencement of handling operations and which can be replaced by a safety plug designed to serve as an additional protection at the time of operation of the reactor. The said unit 12 is also made up of two superposed rings 12a and 12b with concentric staggered profiles fitting one inside the other, a series of springs 13 housed inside boxes 13a which are uniformly spaced apart and integral with the bottom ring 12a, thereby providing the top ring 12b with a suitable degree of elasticity while maintaining a fluid-tight fit with respect to the said bottom ring. In FIG. 1 on the left hand side of the drawing, channel 1 is represented as fitted with a plug 14 which, as will be readily understood, is withdrawn from the channel when performing a fuel-handling operation, the purpose of said plug being to provide fluid-tight closure of the channel during the operation of the reactor as well as the necessary protection against rediations emanating from the core. Finally, the top portion of the tube 5 is fitted with a bellows type sealing joint 5d which is secured on the one hand to the top annular flange 5c and on the other hand to the bottom ring 12a, and which provides fluid-tightness between the tube 5 and the bushing 10 during the movements of displacement of said tube.

FIG. 2 illustrates diagrammatically the structural arrangement of the handling hood which is essentially intended for the purpose of loading or unloading the fuel through the channel which is illustrated in FIG. 1. The hood in accordance with the invention mainly comprises two separate sections which are each formed by a vertical cylindrical body. The lower cylinder or hood body 15 contains a drum 16 while the upper cylinder 17 or chimney contains a gripping unit 18 which is designed for the fuel-handling operation proper. These two sections are placed in separate atmospheres, so that the contaminated coolant which flows inside the handling channel and inside the hood body is not introduced inside the chimney itself. The hood is finally mounted on two trolleys 19 and 20 which are adapted to travel respectively in two directions at right angles to each other.

The trolley 19 or main trolley comprises a frame or chassis 21 which is mounted on four wheels such as the wheel 22, only two of which are driving wheels. The movement of the trolley 19 on the floor 11 of the reactor is controlled by an electric motor (not shown) and the locking of said trolley in a pre-determined position is effected by means of clamps, not shown, which produce a gripping action on each of the driving wheels. Lateral guiding of the trolley is effected by means of three roller system 23 which are mounted in a triangle arrangement and applied against the flanks of the rails such as 24.

The trolley 20 or so-called traversing trolley makes it possible to produce a movement at right angles to that of the trolley 19. For this purpose, the said trolley is mounted on four wheels such as the wheel 25 and its movement is controlled by a set of two pinions such as the pinion 26 designed to drive two racks 27 which are rigidly fixed to the main trolley 19. An electric motor, not shown, which can be duplicated if necessary by a manual emergency-control mechanism, makes it possible to regulate the speed of the movements effected by the trolley 20, while the means adopted for guiding and locking this latter in position are the same as those adopted in the case of the main trolley.

In accordance with the invention, the traversing trolley 20 is designed to support the hood body 15 and permits this latter to travel downwards in a vertical direction by virtue of four hydraulic jacks 28 (only two of these jacks being shown in the plane of the figure) in such manner as to make it possible for the flange 29a of the bushing 29 which forms the bottom end of the hood body 15 to be applied against the corresponding flange 30 located at the top of the handling channel and consequently to permit the downward displacement of the tube 5. As will be observed in FIG. 1, the flange 30 is fitted with two O-rings seals 31 which, when compressed under the weight of the hood body 15, provide suitable fluid-tightness between this latter and the top ring 12b which is supported elastically by the springs 13.

The hood body proper is contstructed of a double casing of welded sheet, there being provided between the walls of said double casing a suitable thickness 32 of a material such as lead, for example, which provides adequate protection against radiation. The top portion of the hood body is closed by a cover 33 fitted with special plugs such as the plug 34 which, after removal of the chimney 17, leave a free passage for the extraction of the elements contained in the drum 16. The said drum 16, which is located inside the hood body, is mounted on two pivot-pins 35 and is adapted to be rotatably driven by an electric motor (not shown) which is located outside the hood body. The drum is fitted with a position indicator, not shown, as a means whereby it is possible at all times to determine which magazine of the drum is located above the orifice of the bushing 29 of the hood body and consequently opposite to the loading channel. In addition, said drum 16 comprises a certain number of storage units designed to contain at the same time both the obturator which closes off the bottom end of the chimney 17, the plug 14 which seals off the loading channel and a guide tube (not shown) which, as the fuel passes through, provides a connection through the flanges 29a and 30 between the hood body 15 and the channel 1. The drum is further adapted to contain either an irradiated fuel element which has just been unloaded from the reactor or conversely a new element which it is desired to introduce inside the core.

Above the hood body, the chimney 17 consists of four cylindrical sections such as the section 37 which are joined together by means of coupling flanges 38, while the bottom portion is secured to the hood body 15 in fluid-tight manner. The chimney contains the manual emergency controls and controls for locking the handling gripper or grappling tongs as well as the mechanisms which are necessary for the guiding and translational movement of the trolley 36 which carries the handling gripper itself and the balancing counterweights of this latter.

Among the advantages provided by the arrangements which have been described in the foregoing, particular emphasis should be laid on the advantage gained by the use of operating jacks which are designed to lower the hood and which are located outside the reactor casing, that is to say in a readily accessible position permitting of both maintenance and rapid servicing in the event of mechanical failure even if such failure occurs during handling operations.

By virtue of this arrangement, there need no longer be present inside the plugs and biological shield of the reactor any piping systems or control units such as would otherwise be necessary for the purpose of applying a movable ring in fluid-tight manner against the underface of a stationary hood in a manner similar to the practice adopted in conventional systems. In accordance with the present invention, the rings 12a and 12b are not dependent on any external control such as electric supply, compressed-fluid supply, etc. The result thereby achieved is an appreciable simplification in the construction of the various elements of the hood and of the rings as well as an undeniable improvement in the general fluid-tightness of the device. Such a quality of fluid-tightness is in fact ensured only by virtue of the elastic coupling and the presence of a bellows type expansion joint, the size of which can be very small by reason of the small displacement of the holding tube.

Finally the connection between the hood and the loading channel maintains continuity of protection against radiation, while the coupling between the two elements is effected within the interior of the top plug or cover of the reactor at a level below that of the flooring used by the operating staff.

It will be understood that the invention is not in any

What we claim is:

1. A sealing system between the handling hood of a nuclear reactor and a loading channel which passes through the reactor cover, comprising: a sealing ring disposed around the top orifice of said loading channel; resilient means normally supporting said ring spaced above said orifice; sealing means connecting said ring and said loading channel; a handling hood having a passage to be connected to said channel disposed above said sealing ring and said channel; and means mounting said hood for vertical movement between a first position spaced above said sealing ring and a second position seated on said ring and in sealing engagement therewith, said hood, when in said second position, moving said ring toward said orifice against the action of said resilient means.

2. A sealing system between the handling hood of a nuclear reactor and a loading channel which passes through the reactor cover, comprising: a sealing ring disposed around the top orifice of said loading channel; resilient means normally supporting said ring spaced above said orifice; longitudinally extensible, flexible sealing means connecting said ring and said loading channel; a handling hood having a passage to be connected to said channel disposed above said sealing ring and said channel; and means mounting said hood for vertical movement between a first position spaced above said ring and a second position seated on said ring and in sealing engagement therewith, said hood, when in said second position, moving said ring toward said orifice against the action of said resilient means.

3. A sealing system between the handling hood of a nuclear reactor and a loading channel which passes through the reactor cover, comprising: a stationary ring disposed around the top orifice of said loading channel, the upper surface of said stationary ring being formed with concentric profiles; a sealing ring disposed above said stationary ring and having concentric profiles formed on the lower surface thereof interfitting with said profiles on said stationary ring; resilient means normally supporting said sealing ring spaced above said stationary ring; sealing means connecting said stationary ring and said loading channel; a handling hood having a passage to be connected to said channel disposed above said sealing ring and said channel; and means mounting said hood for vertical movement between a first position spaced above said sealing ring and a second position seated on said sealing ring and in sealing engagement therewith, said hood, when in said second position, moving said sealing ring toward said stationary ring against the action of said resilient means.

4. A sealing system as defined in claim 3 wherein said resilient means includes a series of equally spaced compression springs mounted between said rings with one end of said springs seated against said stationary ring and with the other end of said springs seated against said sealing ring.

5. A sealing system as defined in claim 4 wherein said sealing means includes an extensible, cylindrically shaped bellows.

6. A sealing system between the handling hood of a nuclear reactor and a loading channel which passes through the reactor cover, comprising: a sealing ring disposed around the top orifice of said loading channel; resilient means normally supporting said ring spaced above said orifice; sealing means connecting said sealing ring and said loading channel; trolley tracks fixedly mounted on the cover of said reactor adjacent said channel, a first trolley mounted on said tracks for movement thereon, a second trolley mounted on said first trolley for movement in a direction at right angles to that of said first trolley, a handling hood having a passage to be connected to said channel mounted on said second trolley for vertical alignment with said sealing ring and said channel and for vertical movement relative thereto; and means mounted on said second trolley and connected to said hood for moving said hood vertically between a first position spaced above said sealing ring and a second position seated on said ring and in sealing engagement therewith, said hood, when in said second position, moving said ring toward said orifice against the action of said resilient means.

7. A sealing system between the handling hood of a nuclear reactor and a loading channel which passes through the reactor cover, comprising: a tube mounted in said loading channel for vertical movement therein; a radially extending flange rigid with the upper end of said tube; a sealing ring disposed around the top orifice of said loading channel and positioned between said flange and said orifice; first resilient means normally supporting said sealing ring spaced above said orifice; second resilient means normally biasing said tube upwardly and maintaining said flange spaced above said sealing ring; sealing bellows permitting relative axial movement connecting said sealing ring and said tube; a handling hood having a passage to be connected to said tube disposed above said flange and said sealing ring; and means mounting said hood for vertical movement between a first position spaced above said flange and said sealing ring and a second position seated on said flange and on said sealing ring and in sealing engagement with both of them; said hood, when in said second position, moving said flange and said sealing ring downwardly against the action of said first and said second resilient means.

8. A sealing system between the handling hood of a nuclear reactor and a loading channel which passes through the reactor cover, comprising: a tube mounted in said loading channel for vertical movement therein; a radially extending flange rigid with the upper end of said tube; resilient sealing means on the upper surface of said flange; a sealing ring disposed around the top orifice of said loading channel and positioned between said flange and said orifice; first resilient means normally supporting said sealing ring spaced above said orifice; second resilient means normally biasing said tube upwardly and maintaining said flange spaced above said sealing ring; sealing bellows connecting said sealing ring and said tube; trolley tracks fixedly mounted on the cover of said reactor adjacent said channel, a first trolley mounted on said tracks for movement thereon, a second trolley mounted on said first trolley for movement in a direction at right angles to that of said first trolley, a handling hood having a passage to be connected to said tube mounted on said second trolley for vertical alignment with said sealing ring and said flange and for vertical movement relative thereto; and means mounted on said second trolley and connected to said hood for moving said hood vertically between a first position spaced above said flange and said sealing ring and a second position seated on said flange and on said sealing ring and in sealing engagement with both of them, said hood, when in said second position, moving said flange and said sealing ring downwardly against the action of said first and said second resilient means.

9. A sealing system as defined in claim 8 in which said sealing ring includes a lower stationary ring and a superposed upper ring, the upper surface of said stationary ring being formed with concentric profiles and with the lower surface of said movable ring having concentric profiles formed therein interfitting with said profiles on said stationary ring, said first resilient means being positioned between and reacting on said stationary ring and said movable ring biasing said rings apart.

10. A sealing system between the handling hood of a nuclear reactor and a loading channel which passes through the reactor cover, comprising: a stationary ring disposed around the top orifice of said loading channel, the upper surface of said stationary ring being formed with concentric profiles; a sealing ring disposed above said stationary ring and having concentric profiles formed on the lower surface thereof interfitting with said profiles on said stationary ring; resilient means normally supporting said sealing ring spaced above said stationary ring; a handling hood having a passage to be connected to said channel disposed above said sealing ring and said channel, and means mounting said hood for vertical movement between a first position spaced above said sealing ring and a second position seated on said sealing ring and in sealing engagement therewith, said hood, when in said second position, moving said sealing ring toward said stationary ring against the action of said resilient means.

References Cited by the Examiner

UNITED STATES PATENTS

| | | | |
|---|---|---|---|
| 2,863,815 | 12/58 | Moore et al. | 176—29 |
| 2,940,618 | 6/60 | Britt | 176—30 X |
| 2,984,612 | 5/61 | Hackney et al. | 176—30 |
| 3,044,947 | 7/62 | Payne | 214—21 |

OTHER REFERENCES

Printed application No. 1,054,185; 4/59, Germany.

CARL D. QUARFORTH, *Primary Examiner.*